US010673697B2

United States Patent
(12) United States Patent
Delegard et al.

(10) Patent No.: US 10,673,697 B2
(45) Date of Patent: Jun. 2, 2020

(54) BRIDGING CONFIGURATION CHANGES FOR COMPLIANT DEVICES

(71) Applicant: Cisco Technology, Inc., San Jose, CA (US)

(72) Inventors: Justin Joel Delegard, San Francisco, CA (US); Adam Weis, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 741 days.

(21) Appl. No.: 15/068,618

(22) Filed: Mar. 13, 2016

(65) Prior Publication Data

US 2017/0264480 A1 Sep. 14, 2017

(51) Int. Cl.

| | |
|---|---|
| ***H04L 12/24*** | (2006.01) |
| ***H04L 29/08*** | (2006.01) |
| ***G06F 9/445*** | (2018.01) |
| ***G06F 8/65*** | (2018.01) |

(52) U.S. Cl.

CPC ........ *H04L 41/082* (2013.01); *G06F 9/44505* (2013.01); *H04L 41/0866* (2013.01); *H04L 67/34* (2013.01); *G06F 8/65* (2013.01); *H04L 41/0846* (2013.01)

(58) Field of Classification Search

CPC ............... H04L 41/0813; H04L 41/082; H04L 41/0846; H04L 41/0866; H04L 67/34; G06F 8/65; G06F 9/44505

USPC .......................................................... 709/221

See application file for complete search history.

(56) References Cited

U.S. PATENT DOCUMENTS

| | | | | |
|---|---|---|---|---|
| 5,835,911 | A * | 11/1998 | Nakagawa | G06F 8/65 |
| 9,471,455 | B2 * | 10/2016 | Horn | G06F 8/65 |
| 9,501,648 | B2 * | 11/2016 | Ruelas | G06F 9/4411 |
| 2002/0174331 | A1 * | 11/2002 | Nock | G06F 9/44505 713/100 |
| 2005/0257210 | A1 * | 11/2005 | Stienhans | G06F 8/65 717/170 |
| 2006/0280207 | A1 * | 12/2006 | Guarini | H04L 41/0853 370/524 |
| 2009/0012966 | A1 * | 1/2009 | Arai | H04L 41/082 |
| 2015/0312275 | A1 * | 10/2015 | Grosskopf | H04L 63/20 726/1 |
| 2015/0339132 | A1 * | 11/2015 | Chen | G06F 9/448 713/100 |
| 2016/0042285 | A1 * | 2/2016 | Gilenson | G06N 5/046 706/47 |

* cited by examiner

*Primary Examiner* — Chris Parry
*Assistant Examiner* — Adam A Cooney
(74) *Attorney, Agent, or Firm* — Polsinelli PC

(57) ABSTRACT

Various implementations disclosed herein provide a mechanism for determining that a configuration status of a compliant device is too far out-of-date, and subsequently bridging the configuration status of the compliant device to the up-to-date configuration data and instructions in response. In various implementations, determination of the configuration status of the compliant device is possible using a single request from the compliant device, which in turn reduces the amount of network traffic and utilization of network resources needed to update the compliant device with the up-to-date configuration data and instructions.

20 Claims, 6 Drawing Sheets

BRIDGING CONFIGURATION CHANGES FOR COMPLIANT DEVICES

TECHNICAL FIELD

The present disclosure generally relates to improving the stability of data networks, and in particular, to devices compliant with remotely hosted network management.

BACKGROUND

The ongoing development of data networks often involves incorporating new functionality and improving connectivity using previously deployed and newly provisioned equipment. As a result, data networks often include various types of equipment. For example, a typical LAN (local area network) often includes equipment from various vendors, equipment that is operable in accordance with particular standards, and equipment of different generations.

One type of equipment is configured to operate in coordination with a remotely hosted network management system provided by the equipment vendor or a third party service provider. The hosted network management system provides services and remote management by way of updated configuration data and instructions to compliant (network) devices. The updated configuration data and instructions are provided in order to ensure that compliant devices remain operable in combination with the updated operating features of the hosted network management system. However, updating large numbers of compliant devices presents a number of challenges. For example, the manner in which updated configuration data and instructions are formatted or otherwise provided for delivery often varies as the system configuration changes, because later updates rely on successful adoption of earlier updates. As such, if a compliant device is too far out-of-date, it is possible that the compliant device will not function as expected or will stop working altogether when it receives the latest update. In other words, erroneous operation can be the result of an out-of-date compliant device failing to adequately track and adopt system changes driven by the hosted network management system. In large networks or a hosted system that manages a great many devices across many networks, it is not practical to negotiate with each compliant device in order to determine a configuration status for each compliant device. Doing so would be a substantial drain on network resources and render a hosted network management system undesirable as networks scale in size.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
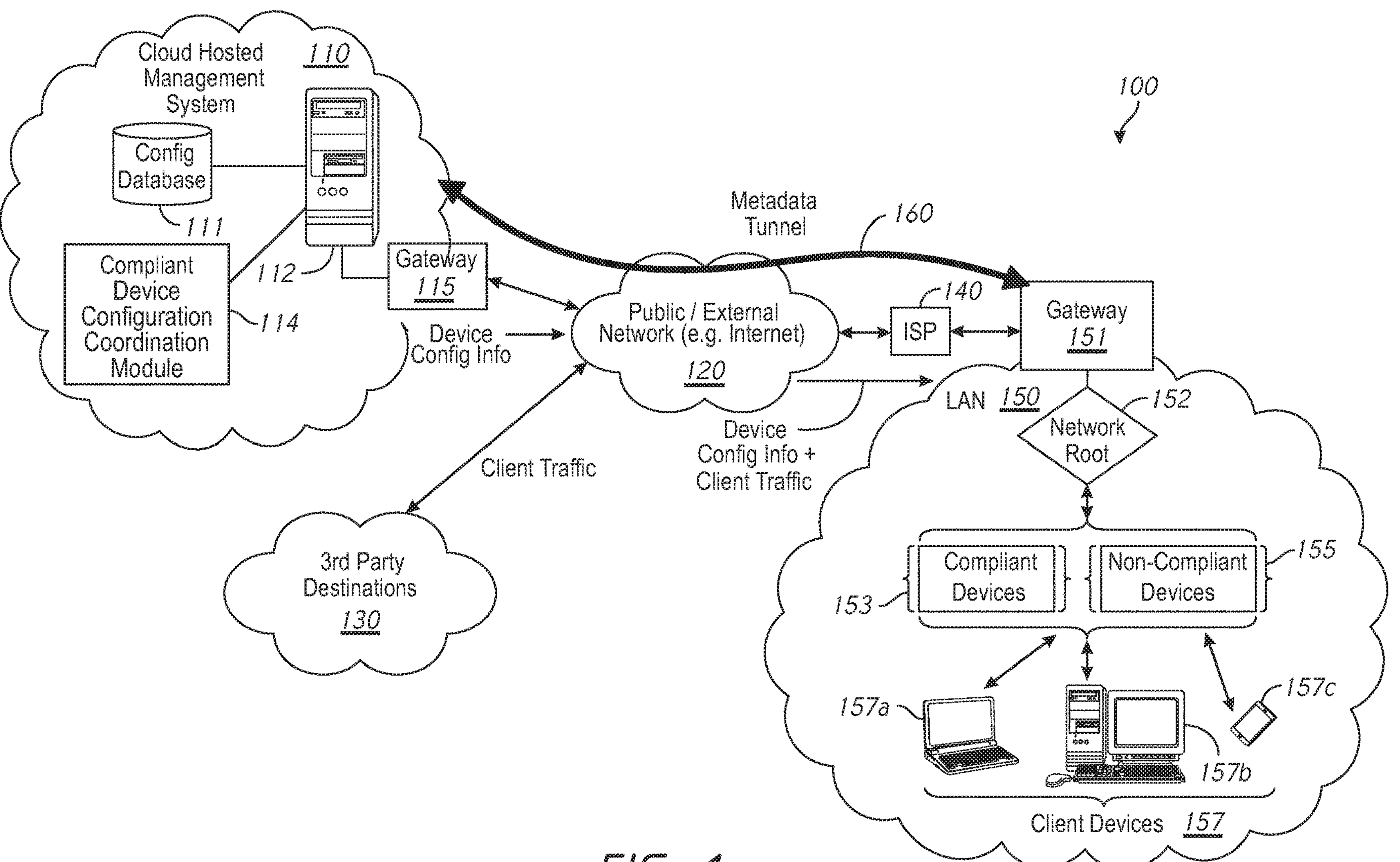
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previously available hosted network management systems fail to provide a mechanism for determining and bridging a configuration status of a compliant device that is too far out-of-date as compared to the latest configuration data and instructions provided by a hosted network management system. As a result, in previously available hosted network management systems, blind pushes and pulls of up-to-date configuration data and instructions risk connectivity and/or service failures in compliant devices that ultimately receive the up-to-date configuration data and instructions. By contrast, various implementations disclosed herein provide a mechanism for determining that a configuration status of a compliant device is too far out-of-date, and subsequently bridging the configuration status of the compliant device to the up-to-date configuration data and instructions in response. In various implementations, determination of the configuration status of the compliant device is possible using a single request from the compliant device, which in turn reduces the amount of network traffic and utilization of network resources needed to update the compliant device with the up-to-date configuration data and instructions. For example, in some implementations, a method of bridging configuration changes for compliant devices includes obtaining a cached configuration file from a respective compliant device cache included in a hosted network management system, wherein the respective cached configuration file is associated with a corresponding compliant device; generating a new configuration file including updated configuration data and instructions for the corresponding compliant device; determining whether or not the cached configuration file matches the new configuration file within a match threshold; and providing one of the cached configuration file and the new configuration file to the compliant device based on the determination of whether or not the cached configuration file matches the new configuration file within a match threshold.

FIG. 1 is a block diagram of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a public/external network 120 (e.g., a portion of the Internet), one or more third-party destinations 130 (e.g., providing various third-party content and services), a cloud hosted network management system 110, an Internet service provider (ISP) node 140 and a local area network (LAN) 150.

The one or more third-party destinations 130 provide various third-party content and services, such as email, media content (e.g., video, music, gaming, etc.), online banking, social networking servers, etc. Other than providing sources and/or destinations for client data traffic, an exhaustive description of the numerous examples of third-party destinations are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant networking devices 153, a number of non-compliant networking devices 155, and a number of client devices 157. The gateway device 151 connects the LAN 150 to the public network 120 through the ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical place-holder within the LAN 150. In such instances, the root node 152 merely provides a convenient LAN node that is separate from the gateway node 151. In some implementations, the root node 152 is an actual physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157*a*, workstation 157*b*, smartphone 157*c*, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant networking devices 153 and the non-compliant networking devices 155 is based at least on how uplink metadata is processed by each and/or the extent to which a device is able to functionally cooperate with the cloud hosted network management system 110. In some implementations, a non-compliant device erroneously forwards uplink metadata received from one compliant device to another, even though the non-compliant device correctly routes externally addressed traffic received from the compliant devices. That is, while a non-compliant device correctly routes externally addressed traffic towards the gateway node 151, the non-compliant device also incorrectly forwards uplink metadata because it is not configured to recognize and process uplink metadata properly. By contrast, a compliant device in the hypothetical place of a non-compliant device is configured to recognize uplink metadata as information it should use and not forward from one compliant device to another device. Additionally and/or alternatively, in some implementations, in response to a request to do so, compliant devices report their own uplink metadata (e.g., such as LLDP frames) to a requesting device. Additionally and/or alternatively, in some implementations, in response to a request to do so, compliant devices operate in accordance with configuration data and instructions, software and/or firmware updates, and rules (hereinafter "configuration data and instructions" for brevity) provided by the cloud hosted network management system 110. To that end, in accordance with some implementations, a metadata tunnel 160 is established from the gateway node 151 of the LAN 150 to the gateway node 115 of the cloud hosted network management system 110.

Updated configuration data and instructions are provided in order to ensure that compliant devices (e.g., compliant devices 153 of FIG. 1) remain operable in combination with the updated operating features of the cloud hosted network management system 110. However, updating large numbers of compliant devices 153 presents a number of challenges. For example, the manner in which updated configuration data and instructions are formatted or otherwise provided for delivery often varies as the system configuration changes, because later updates rely on successful adoption of earlier updates. As such, if a particular compliant device 153 is too far out-of-date, it is possible that the compliant device will not function as expected or will stop working altogether when it receives the latest update. In other words, erroneous operation can be the result of an out-of-date compliant device failing to adequately track system changes driven by the hosted network management system. In large networks or for a hosted system that manages a large number of devices across many networks, it is not practical to negotiate with each compliant device 153 in order to determine a configuration status for each compliant device 153. Doing so would be a substantial drain on network resources and render the cloud hosted network management system 110 undesirable as networks, such as LAN 150, scale in size.

Additionally, a private network may inadvertently block or limit blind configuration pushes from the cloud hosted network management system 110 to compliant devices within the private network. For example, if the LAN 150 is a private network, security appliances and/or modules used to establish and maintain private accessibility of the LAN 150 may inadvertently block or limit blind configuration pushes from the cloud hosted network management system 110. As a result, compliant devices 153, within a private network, may be too far out-out-date when subsequent blind configuration pushes are permitted within the private network. In some cases this can cause connectivity and service failures within the private network because compliant devices 153 may be too far out-of-date when the latest configuration data and instructions arrive as a result of earlier blocked attempts to update the compliant devices 153. Additionally, compliant devices 153 are also sometimes configured to pull updated configuration data and instructions from the cloud hosted network management system 110. Blind configuration pulls of this type can bypass local control mechanisms of a private network when compliant devices 153 reboot or have been newly provisioned within the private network. Thus, similar to blind pushes, blind pulls (or fetches) of updated configuration data and instructions can cause connectivity and service failures in the private network, such as the LAN 150.

The cloud hosted network management system 110 is configured to manage the configuration and operation of compliant devices in a LAN and/or across geographically distributed portions of a VLAN in accordance with vendor-provided configuration instructions, software and/or firmware updates, and rules. To that end, the cloud hosted network management system 110 includes a configuration database 111, a cloud hosted management server 112, a compliant device configuration coordination module 114, and a gateway device 115. The gateway device 115 connects the cloud hosted management server 112 to the public network 120 so that the cloud hosted management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

As described in greater detail below with reference to FIGS. 3 to 5, in various implementations, the compliant device configuration coordination module 114 is configured to determine when a configuration status of a compliant device is too far out-of-date, and subsequently bridge the configuration status of the compliant device to the up-to-date configuration data and instructions in response to that determination. In some implementations, the compliant device configuration coordination module 114 also prompts manual intervention before permitting a push of new and/or updated configuration instructions, software and/or firmware updates, and rules from the cloud hosted network management system 110. Moreover, while the compliant device configuration coordination module 114 is illustrated as a single device, those of ordinary skill in the art will appreciate that, in various implementations, the compliant device configuration coordination module 114 includes one or more devices and a suitable combination of software, hardware and/or firmware distributed throughout the cloud hosted network management system 110.

In some implementations, the ISP node 140 is provided to link the LAN 150 to the public network 120, and serves as a network service provider access point. Similar to the gateway nodes 115, 151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 2:
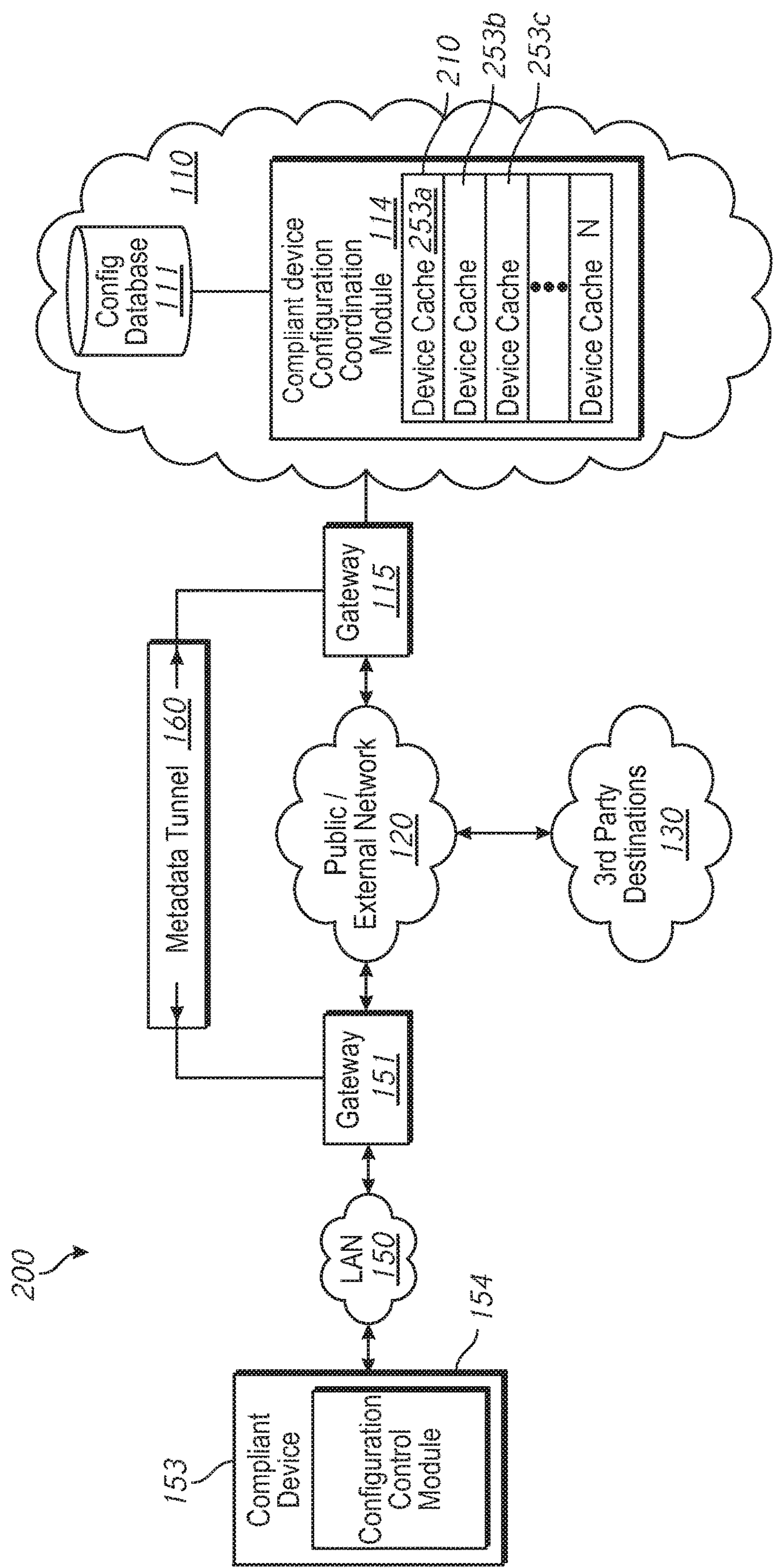
FIG. 2 is a block diagram of a data networking environment in accordance with some implementations.

FIG. 2 is a block diagram of a data networking environment 100 in accordance with some implementations. The data networking environment 200 shown in FIG. 2 is similar to and adapted from the data networking environment 100 shown in FIG. 1. Elements common to FIGS. 1 and 2 include common reference numbers, and only the differences between FIGS. 1 and 2 are described herein for the sake of brevity.

To that end, FIG. 2 illustrates a simplified arrangement including a compliant device 153 shown in the context of a networking environment. The compliant device 153 (e.g., a wireless access point, a router, a switch, etc.) is included in the LAN 150 behind the LAN gateway node 151. In some implementations, the compliant device 153 includes a configuration control module 154. In various implementations, the configuration control module 154 operates to receive and effectuate adoption of new and/or updated configuration instructions, software and/or firmware updates, and rules provided by the cloud hosted network management system 110, and/or effectuate to pulls of the same from the cloud hosted network management system 110.

Additionally, FIG. 2 illustrates the configuration database 111, and the compliant device configuration coordination module 114. As noted above, in various implementations, the compliant device configuration coordination module 114 determines which, if any, of updated configuration data and instructions are permitted to be pushed to a complaint device 153 based on an assessment of a configuration status of the compliant device 153. Also, as appropriate, the compliant device configuration coordination module 114 bridges the configuration status of the compliant device to the up-to-date configuration data and instructions provided by the cloud hosted network management system 110. To that end, in various implementations, the compliant device configuration coordination module 114 includes an allocation of local memory and/or firmware 210. The local memory and/or firmware 210 includes respective device caches (e.g. device cache 253*a*, device cache 253*b*, device cache 253*c*, etc.) for corresponding compliant devices 153. Each device cache includes a suitable combination of instructions, heuristics, and/or metadata that indicates how and when updated configuration data and instructions were provided to particular compliant devices 153.

FIG. 2 also illustrates the metadata tunnel 160 as being a conceptually separate communication channel between the respective gateway nodes 151, 115, as compared to the public/external network 120 (e.g., a portion of the Internet). In some implementations, the metadata tunnel 160 utilizes portions of the public/external network 120. To that end, in some implementations, metadata tunnel packets are marked and/or contain header fields that enable the prioritization of metadata tunnel packets on at least some portions of the public/external network 120. In some implementations, the prioritization of metadata tunnel packets includes the use of dedicated routing paths between client devices and the cloud hosted network management system 110 in order to reduce latency and/or improve reliability. In some implementations, the prioritization of metadata tunnel packets includes bandwidth reservations for metadata tunnel traffic on at least one routing path between one or more client devices and the cloud hosted network management system 110.

Figure 3:
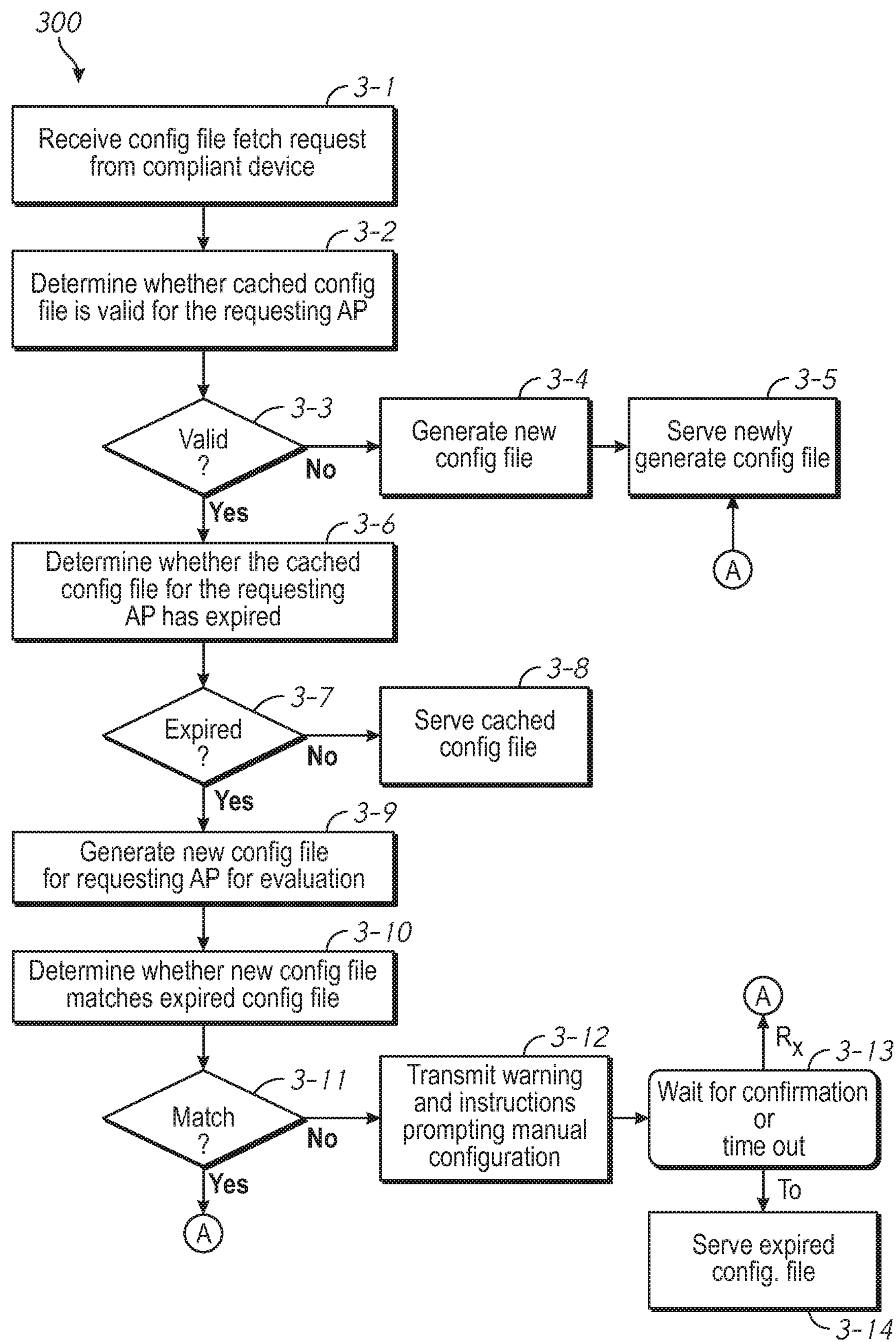
FIG. 3 is a flowchart representation of a method of detecting and bridging configuration file changes for a compliant device in accordance with some implementations.

FIG. 3 is a flowchart representation of a method 300 of determining and bridging configuration changes for a compliant device according to some implementations. In various implementations, the method 300 is performed by a compliant device configuration coordination module (e.g., the compliant device configuration coordination module 114 shown in FIGS. 1 and 2) included in and/or associated with a cloud hosted network management system (e.g., the cloud hosted network management system 110 shown in FIGS. 1 and 2). Briefly, the method 300 includes receiving a configuration fetch request from a compliant device, determining if a configuration status of the compliant device is too far out-of-date, and responsively bridging the configuration status of the compliant device to the up-to-date configuration data and instructions.

To that end, as represented by block 3-1, in some implementations the method 300 includes receiving a fetch request from a compliant device. In some implementations, the fetch request indicates compliant device demand for updated (or new) configuration data and instructions. In some implementations, a fetch request comprises at least a portion of a configuration pull process initiated by the compliant device. As an example, with reference to FIGS. 1 and 2, the compliant device configuration coordination module 114 receives a fetch request from a compliant device 153 through the metadata tunnel 160 between the gateway devices 115, 151. For example, the fetch request is received as a result of power-cycling (or reboot) of a compliant access point that has momentarily decoupled from the regulation of local control of a LAN or the like. In some implementations, the fetch request is received as a result of a local configuration controller (of a LAN) missing or failing to check that particular aspects of new or updated configuration data and/or instructions (etc.) may negatively impact connectivity and/or services in the associated private network. In another example, the fetch request is received from a compliant device operating as a public access point and/or within an unregulated or loosely managed network.

As represented by block 3-2, in some implementations the method 300 includes determining whether the cached configuration file associated with the requesting compliant device is valid. In various implementations, the cached configuration file is a copy of the last known configuration file generated and sent to the requesting compliant device and/or a copy of the last known configuration file that should have been received and adopted by the requesting compliant device. In some implementations, validity of the cached configuration file is evaluated based on a suitable combination of instructions, heuristics, and/or metadata that indicates how and when updated configuration data and instructions were previously provided to the requesting compliant device. For example, if the cached configuration file includes references to services or functions that the cloud hosted network management system 110 no longer supports or relies on, the cached configuration file is considered invalid. Similarly, if the cached configuration file does not include indications of security features adopted by the cloud hosted network management system 110, the cached configuration file is considered invalid. In another example, validity is determined based on whether or not a cached time value matches a configuration change time within a threshold amount. In other words, if the time at which the last configuration filed was added to the cache does not align with a scheduled configuration change time, the cached configuration file is considered invalid. In contrast, in some implementations, determining that a configuration file has expired (with respect to a recency threshold described below) indicates that a cache expiration threshold (or recency threshold) has been violated but the configuration change time has not yet changed. As an example, with reference to FIG. 2, in various implementations, a cached configuration file is stored in a respective device cache (e.g. device cache 253*a*, device cache 253*b*, device cache 253*c*, etc.) for the corresponding compliant device 153, within the allocation of local memory and/or firmware 210. In various implementations, the method includes obtaining the cached configuration file from a (compliant) device cache included in an allocation of local memory and/or firmware associated with the hosted network management system. In some implementations, a respective cached configuration file is retrieved from the allocation of memory. In some implementations, a respective cached configuration file is received from firmware associated with the hosted network management system.

As represented by block 3-3, in some implementations the method 300 includes determining whether or not the cached configuration file is valid within a validity threshold based on the above determination result. If the validity threshold is not satisfied based on the determination result ("No" path from block 3-3), as represented by block 3-4, in some implementations, the method 300 includes generating a new and/or updated configuration file for the requesting compliant device. In various implementations, a configuration file includes a combination of configuration data, instructions, software and/or firmware updates, and rules provided by the cloud hosted network management system in order to update the compliant device. Subsequently, as represented by block 3-5, in some implementations, the method 300 includes serving the newly generated configuration file to the requesting compliant device.

Returning again to block 3-3, if on the other hand, the validity threshold is satisfied based on the determination result ("Yes" path from block 3-3), as represented by block 3-6, in some implementations, the method 300 includes evaluating the extent to which a cached configuration file associated with the requesting compliant device satisfies a recency threshold. In some implementations, the recency threshold serves as a proxy that characterizes whether the new or updated configuration data and/or instructions satisfy the latest rules of the cloud hosted network management system. In other words, in some implementations, the recency threshold serves as an initial threshold check that can be used to avoid more stringent assessment of the fetch request, which would require more processing time, more power and reduce the availability and utilization of the compliant device during the more stringent assessment.

As represented by block 3-7, in some implementations the method 300 includes determining whether or not the recency threshold is satisfied based on the above evaluation result. That is, the method 300 includes determining whether or not the cached configuration file has expired such that it is considered too far out-of-date to be provided to the requesting compliant device. If the cached configuration file is not expired based on the evaluation of the recency threshold ("No" path from block 3-7), as represented by block 3-8, in some implementations the method 300 includes serving the cached configuration instructions, software and/or firmware updates, and rules provided by the cloud hosted network management system. On the other hand, if the cached configuration file has expired based on the evaluation of the recency threshold ("Yes" path from block 3-7), as represented by block 3-9, in some implementations the method 300 includes generating a new and/or updated configuration file for the requesting AP for further evaluation.

As represented by block 3-10, the method 300 includes determining whether the newly generated configuration file matches the expired cached configuration file within a match threshold. In various implementations, the match threshold characterizes the extent to which the newly generated configuration file and the expired cached configuration file are allowed to differ from one another. In some implementations, a match threshold necessitates that particular configuration variables must match, but that the matching configuration variables may have different values. For example, in some implementations, a configuration variable may include that a port is specified for use as a VPN (virtual private network) connection, and a corresponding variable value may be a port identifier. In some implementations, a match threshold permits that a new configuration variable may be present in the newly generated configuration file that is not present in the cached configuration file. More detailed examples of how the newly generated configuration file and the expired cached configuration file are compared to determine a match result are described below with reference to FIGS. 4 and 5.

As represented by block 3-11, in some implementations the method 300 includes determining whether or not the newly generated configuration file and the expired cached configuration file match within the match threshold based on the previous determination result. If the newly generated configuration file and the expired cached configuration file match within the match threshold ("Yes" path from block 3-11), as represented by block 3-5, in some implementations, the method 300 includes serving the newly generated configuration file to the requesting compliant device. On the other hand, if the newly generated configuration file and the expired cached configuration file do not match within the match threshold ("Yes" path from block 3-11), as represented by block 3-12, in some implementations, method 300 includes transmitting a warning message and/or instructions prompting manual confirmation associated with the requesting compliant device. For example, with reference to FIG. 1, the warning and/or instructions are transmitted by the compliant device configuration coordination module 114 to one of the root node 152 or the requesting compliant device 153 using the metadata tunnel 160.

Subsequently, as represented by block 3-13, in some implementations the method 300 includes waiting for confirmation for a specified timeout period. If a confirmation is not received from either a local configuration controller or the requesting compliant device within the specified timeout period ("TO" path from block 3-13), as represented by block 3-14, in some implementations, the method 300 includes serving the expired cached configuration file to the requesting compliant device. On the other hand, if a confirmation is received from either a local configuration controller or the requesting compliant device within the specified timeout period ("Rx" path from block 3-13), the method 300 proceeds to the portion of the method 300 represented by block 3-5 described above.

Figure 4:
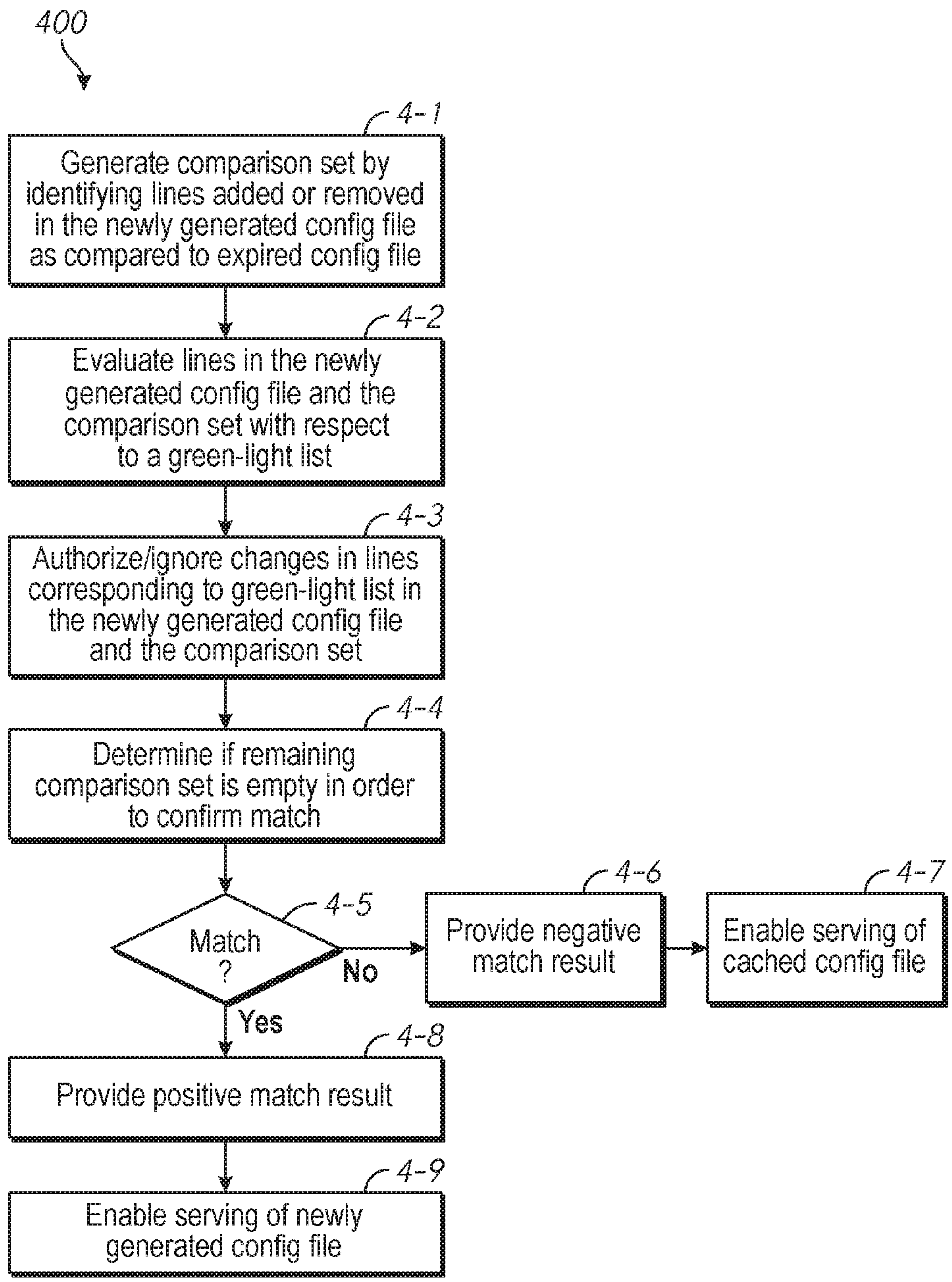
FIG. 4 is a flowchart representation of a method of determining differences in configuration files for a compliant device in accordance with some implementations.

FIG. 4 is a flowchart representation of a method 400 of determining differences in configuration files for a compliant device according to some implementations. In various implementations, the differences are determined between the newly generated configuration file and the expired cached configuration file described above with reference to FIG. 3. In various implementations, the method 400 is performed by a compliant device configuration coordination module (e.g., the compliant device configuration coordination module 114 shown in FIGS. 1 and 2) included and/or associated with a cloud hosted network management system (e.g., the cloud hosted network management system 110 shown in FIGS. 1 and 2). Briefly, the method 400 includes generating a comparison set based on the differences between the newly generated configuration file and the expired cached configuration file; and determining a match result as a function of whether or not the comparison set is an empty set and/or safe set based on a green-light list.

To that end, as represented by block 4-1, in some implementations the method 400 includes generating a comparison set by identifying lines added or removed in the newly generated configuration file as compared to the expired cached configuration file (or vice versa). Each of the lines added or removed represent configuration changes driven by a cloud hosted management system. In various implementations, the lines that match between the newly generated configuration file and the expired cached configuration file can be safely ignored because they do not represent configuration changes that could cause service disruptions and/or connectivity failures.

As represented by block 4-2, in some implementations the method 400 includes evaluating lines that are in both the newly generated configuration file and the comparison set with respect to a green-light list. In various implementations, a green-light list includes a list of configuration variables that can be added to or removed from a configuration file, or changed within a configuration file with little or no risk of causing service disruptions and/or connectivity failures at an out-of-date compliant device that ultimately receives the configuration file including the changes. For example, a green-light list may include a configuration variable that is provided to specify that a port is provided for use as a VPN connection. In many circumstances, the actual port identifier, that is the corresponding variable value, can be changed without disrupting service and/or connectivity for the compliant device that receives the configuration file with the change. As such, in such instances, so long as the configuration variable is present in the newly generated configuration file, changes in the corresponding variable value can be safely ignored. In other example, the green-light list includes a new configuration variable that can be safely added to a newly generated configuration file or is absent in the expired cached configuration file. In yet another example, the green-light list includes a configuration variable that can be safely removed from the expired cached configuration file or absent in the newly generated configuration file. An example of a configuration variable that may be included on a green-light list from time-to-time includes a SSH (secure shell) key list. A SSH key is provided to allow support personnel to establish a secure shell. In many cases it is provided temporarily, and is asynchronously removed from devices after a set duration (e.g. 3-6 months). Another example of a green-light configuration variable is a list of organizationally unique identifiers (OUIs) that are considered trustworthy. In view of the foregoing, those of ordinary skill in the art will appreciate that the green-light list characterizes one or more match thresholds in various implementations.

As represented by block 4-3, in some implementations the method 400 includes authorizing or ignoring changes in lines that are in the newly generated configuration file and the comparison set, so long as those lines are on the green-light list. As represented by block 4-4, in some implementations the method 400 includes determining if the comparison set is empty—after ignoring lines that are on the green-light list—in order to confirm a match between the newly generated configuration file and the expired cached configuration file.

Subsequently, as represented by block 4-5, in some implementations the method 400 includes deciding whether or not the newly generated configuration file and the expired cached configuration file match. If the comparison set is not empty—even after ignoring lines that are on the green-light list—the newly generated configuration file and the expired cached configuration file do not match within a match threshold ("No" path from block 4-5). Consequently, as represented by block 4-6, in some implementations the method 400 includes providing a negative match result. In some implementations, as represented by block 4-7, the method 400 also then includes enabling the serving of the expired cached configuration file as described above with reference to FIG. 3.

Referring again to block 4-5, if on the other hand, the comparison set is empty—after ignoring lines that are on the green-light list—there is a satisfactory match ("Yes" path from block 4-5). In turn, as represented by block 4-8, in some implementations the method 400 includes providing a positive match result. In some implementations, as represented by block 4-9, the method 400 then includes enabling the serving of the newly generated configuration file as described above with reference to FIG. 3.

Figure 5:
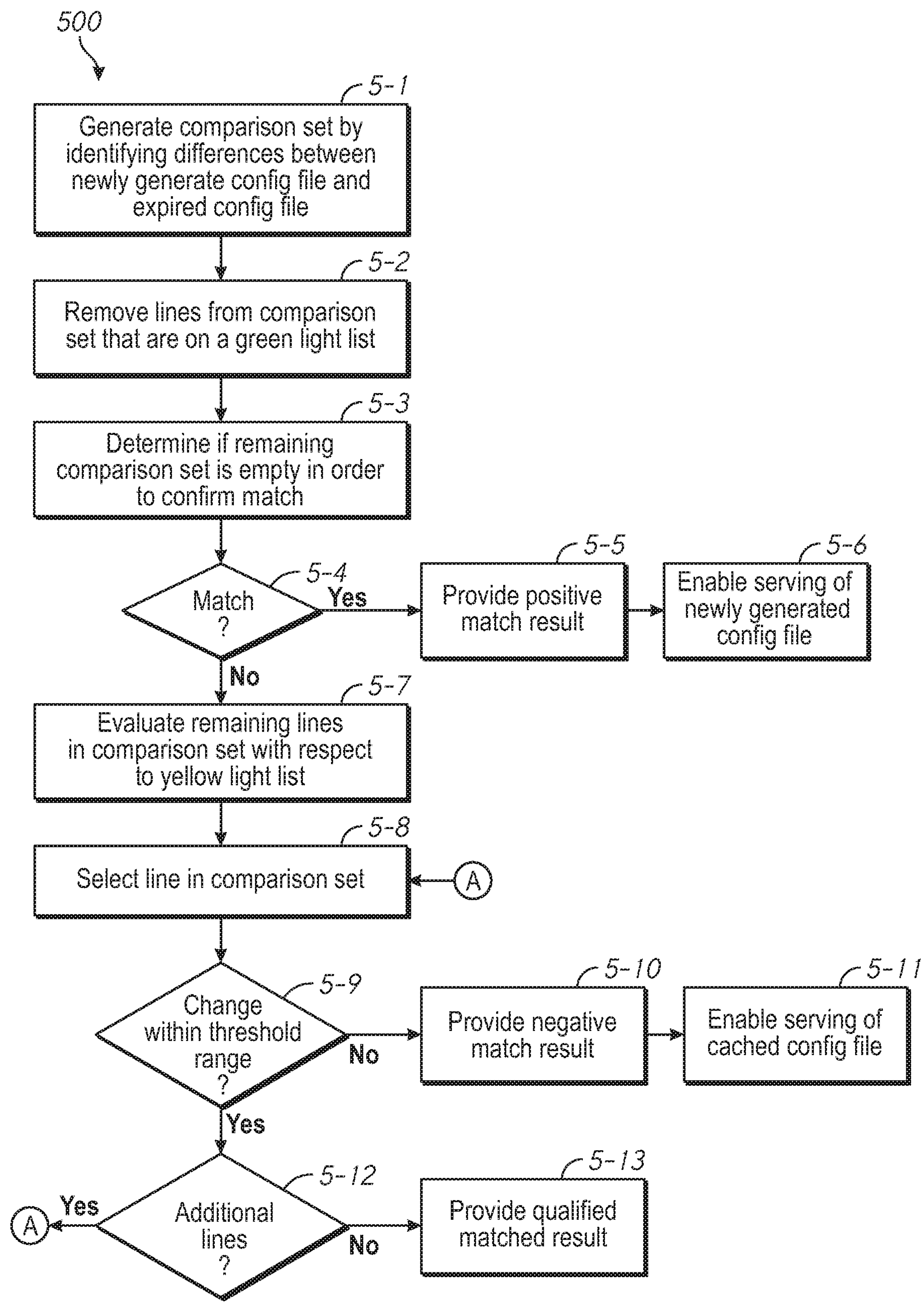
FIG. 5 is a flowchart representation of a method of determining differences in configuration files for a compliant device in accordance with some implementations.

FIG. 5 is a flowchart representation of a method 500 of determining differences in configuration files for a compliant device according to some implementations. In various implementations, the differences are determined between the newly generated configuration file and the expired cached configuration file described above with reference to FIG. 3. In various implementations, the method 500 is performed by a compliant device configuration coordination module (e.g., the compliant device configuration coordination module 114 shown in FIGS. 1 and 2) included and/or associated with a cloud hosted network management system (e.g., the cloud hosted network management system 110 shown in FIGS. 1 and 2). Briefly, the method 500 includes generating a comparison set based on the differences between the newly generated configuration file and the expired cached configuration file; and determining a match result as a function of whether or not the comparison set is an empty set and/or safe set based on a green-light list and a yellow-light list. In various implementations, the green-light list and the yellow-light list permit varying degrees of tolerable mismatch that characterize match threshold levels.

To that end, as represented by block 5-1, the method 500 includes generating a comparison set by identifying lines added or removed in the newly generated configuration file as compared to the expired cached configuration file (or vice versa). As described above, each of the lines added or removed represent configuration changes driven by a cloud hosted management system. In various implementations, the lines that match between the newly generated configuration file and the expired cached configuration file can be safely ignored because they do not represent configuration changes that could cause service disruptions and/or connectivity failures.

As represented by block 5-2, in some implementations the method 500 includes removing lines from the comparison set that are on a green-light list. As described above, in various implementations, a green-light list includes a list of configuration variables that can be added to or removed from a configuration file, or changed within a configuration file with little or no risk of causing service disruptions and/or connectivity failures at an out-of-date compliant device that ultimately receives the configuration file including the changes.

As represented by block 5-3, in some implementations the method 500 includes determining whether the comparison set is empty after removing the lines that are on the green-light list. As represented by block 5-4, in some implementations the method 500 includes determining a match between the newly generated configuration file and the expired cached configuration file when the comparison set is empty ("Yes" path from block 5-4). In turn, as represented by block 5-5, in some implementations the method 500 includes providing a positive match result. In some implementations, as represented by block 5-6, the method 500 also then includes enabling the serving of the newly generated configuration file as described above with reference to FIG. 3.

Referring again to block 5-4, if, on the other hand, the comparison set is not empty after removing the lines on the green-light list ("No" path from block 5-4) a match is not yet determined. Subsequently, as represented by block 5-7, in some implementations, the method 500 includes evaluating lines that are in the newly generated configuration file and the comparison set in view of a yellow-light list. In various implementations, a yellow-light list includes a list of configuration variables that cannot optionally be added to or removed from a configuration file, or arbitrarily changed within a configuration file with little or no risk of causing service disruptions and/or connectivity failures at an out-of-date compliant device that ultimately receives the configuration file. In various implementations, a configuration variable on the yellow-light list is bound by respective threshold range that limits how much the configuration variable value can change with little or no risk of causing service disruptions and/or connectivity failures at an out-of-date compliant device that ultimately receives the configuration file including the changes. That is, the yellow-light list provides thresholds that characterize respective tolerable changes to particular configuration variables. An example of a yellow-light configuration variable includes a firewall host identifier, which lists a number of allowed ports of a security appliance. Another example of a yellow-light configuration variable includes a valid channel listing, which lists which RF (radio frequency) channels a devices is permitted to transmit on in accordance with country-specific laws and regulations (e.g., FCC regulations).

Accordingly, as represented by block 5-8, in some implementations the method 500 includes selecting a line in the remaining comparison set for further evaluation in view of the yellow-light list. As represented by block 5-9, in some implementations the method 500 includes determining whether or not a change to a configuration variable on the selected line is within a respective threshold range. The respective threshold range characterizes a tolerable change to the value of the corresponding configuration variable, which has little or no risk of causing service disruptions and/or connectivity failures at an out-of-date compliant device that ultimately receives the change. If the change is not within the threshold range ("No" path from block 5-9), as represented by block 5-10, in some implementations the method 500 includes providing a negative match result. In some implementations, as represented by block 5-11, the method 500 also then includes enabling the serving of the expired cached configuration file as described above with reference to FIG. 3. On the other hand, if the change is within the threshold range ("Yes" path from block 5-9), the change to the configuration variable on the selected line is considered safe or tolerable. Subsequently, as represented by block 5-12, in some implementations the method 500 includes determining if there are additional lines in the comparison set to consider. If there are additional lines to consider ("Yes" path from block 5-12), the method 500 circles back to the portion of the method represented by block 5-8. On the other hand, if there are no additional lines to consider within the comparison set ("No" path from block 5-12), as represented by block 5-13, in some implementations the method 500 includes providing a qualified matched result. In various implementations, a qualified matched result is provided to indicate that the newly generated configuration file and the expired cached configuration file have differences that are considered nominally tolerable in accordance with the yellow-light list.

Figure 6:
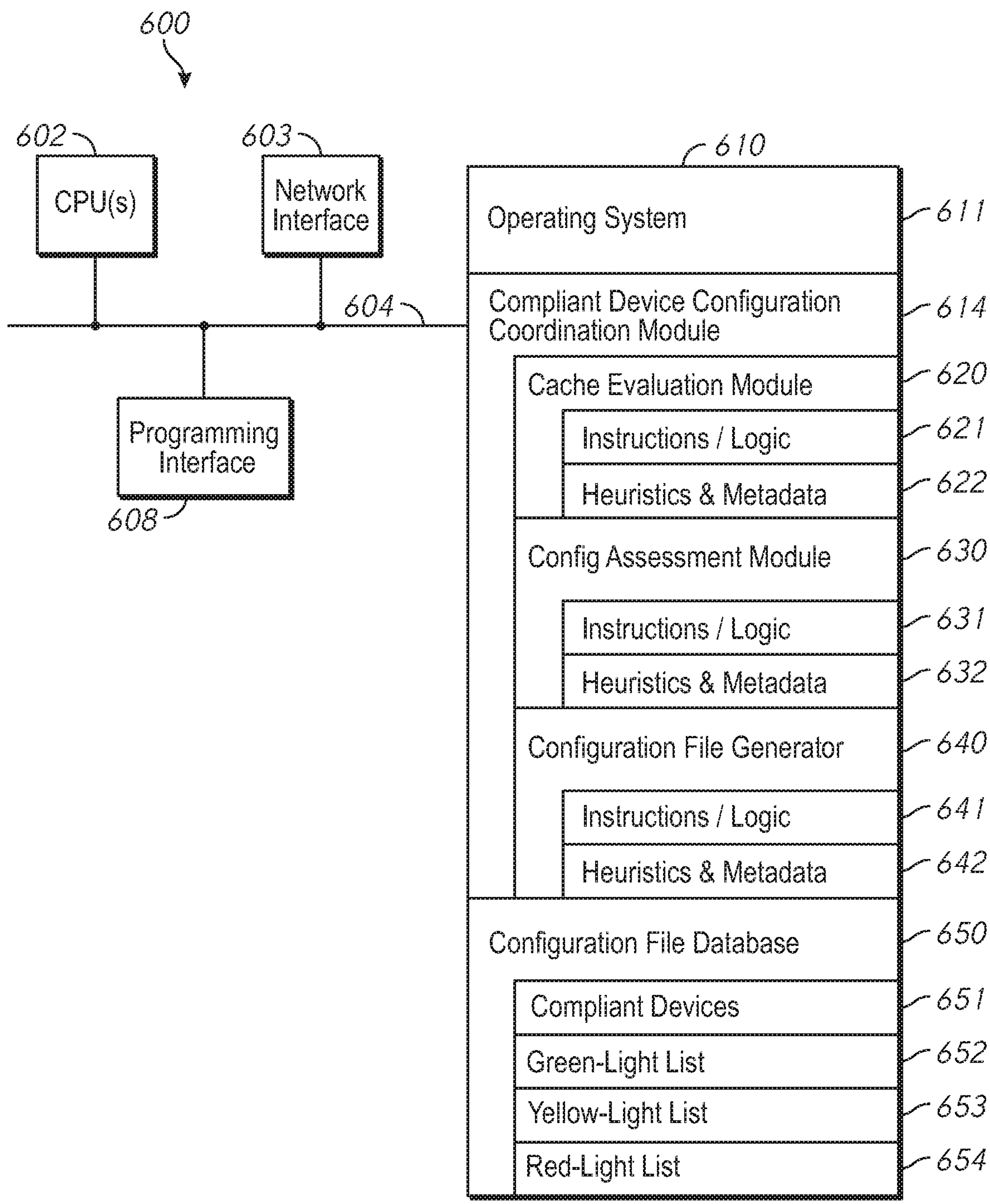
FIG. 6 is a block diagram of a server system enabled with a compliant device configuration coordination module provided to detect and bridge configuration changes for compliant devices in accordance with some implementations.

FIG. 6 is a block diagram of a server system 600 enabled with a compliant device configuration coordination module provided to detect and bridge configuration changes for compliant devices according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPU's) 602, a network interface 603, a memory 610, a programming interface 608, and one or more communication buses 604 for interconnecting these and various other components.

In some implementations, the network interface 603 is provided to, among other uses, establish and maintain a metadata tunnel between a cloud hosted network management system and at least one private network including one or more compliant devices. For example, with reference to FIG. 1, the metadata tunnel 160 is established and maintained from the gateway node 151 of the LAN 150 to the gateway node 115 of the cloud hosted network management system 110. In some implementations, the communication buses 604 include circuitry that interconnects and controls communications between system components. The memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium.

In some implementations, the memory 610 or the non-transitory computer readable storage medium of the memory 610 stores the following programs, modules and data structures, or a subset thereof including an optional operating system 611, a compliant device configuration coordination module 614, and a configuration file database 650.

The operating system 611 includes procedures for handling various basic system services and for performing hardware dependent tasks.

In some implementations, the compliant device configuration coordination module 614 is configured to operate in concert with one or more respective local configuration controllers associated with corresponding private networks. For example, with additional reference to FIGS. 1 and 2, the compliant device configuration coordination module 614 operates to reduce service disruptions and/or failures caused by new and/or updated configuration instructions, software and/or firmware updates, and rules available from the cloud hosted network management system 110—as described above with reference to FIG. 3-5. To that end, in various implementations, the compliant device configuration coordination module 614 includes a cache evaluation module 620, a configuration assessment module 630, and a configuration file generator 640. In various implementations, these and other modules included in the server system 600 include a suitable combination of software, hardware and/or firmware including digital logic, machine-executable computer code instructions and programmable logic.

In some implementations, the cache evaluation module 620 is configured to evaluate the extent to which a cached configuration file associated with the requesting compliant device is valid and/or satisfies a recency threshold, as described above with reference to FIG. 3. As noted above, in some implementations, validity of the cached configuration file is evaluated based on a suitable combination of instructions, heuristics, and/or metadata that indicates how and when updated configuration data and instructions were previously provided to the requesting compliant device. Also as noted above, in some implementations, the recency threshold serves as a proxy that characterizes whether the new or updated configuration data and/or instructions satisfy the local rules of the associated private network. In other words, in some implementations, the recency threshold serves as an initial threshold check that can be used to avoid more stringent assessment of the fetch request, which would require more processing time, more power and reduce the availability of the compliant device during the more stringent assessment. To that end, in various implementations, the cache evaluation module 620 includes instructions and/or logic 621, and heuristics and metadata 622.

In some implementations, the configuration assessment module 630 is configured to assess whether or not a newly generated configuration file and an expired cached configuration file match in accordance within one or more match thresholds. As described above with reference to FIGS. 3 and 4, in some implementations, a match is determined by generating a comparison set based on the differences between the newly generated configuration file and the expired cached configuration file; and determining a match result as a function of whether or not the comparison set is an empty set and/or safe set based on a green-light list. As described above with reference to FIGS. 3 and 5, in some implementations, a match is determined by generating a comparison set based on the differences between the newly generated configuration file and the expired cached configuration file; and determining a match result as a function of whether or not the comparison set is an empty set and/or safe set based on a green-light list and a yellow-light list. In various implementations, the green-light list and the yellow-light list permit varying degrees of tolerable mismatch that characterize match threshold levels. To that end, in various implementations, the configuration assessment module 630 includes instructions and/or logic 631, and heuristics and metadata 632.

In some implementations, the configuration file generator 640 is configured to generate a new and/or updated configuration file, as well as the comparison set described above. In various implementations, a configuration file includes a combination of configuration data, instructions, software and/or firmware updates, and rules provided by the cloud hosted network management system. In various implementations, the configuration file generator 640 is configured to serve newly generated and/or updated configuration data and/or instructions to a requesting compliant device in coordination with the network interface 603. In various implementations, the configuration file generator 640 is also configured to generate a comparison set by identifying lines added or removed in the newly generated configuration file as compared to the expired cached configuration file (or vice versa) To that end, in various implementations, the configuration file generator 640 includes instructions and/or logic 641, and heuristics and metadata 642.

In some implementations, the configuration database 650 is configured to store and maintain configuration data and/or updates for a number of private networks and associated compliant devices. To that end, in various implementations, the configuration database 650 includes a first allocation of non-transitory memory 651 provided to store and maintain configuration data and/or updates for a number of compliant devices. Similarly, in various implementations, the configuration database 650 includes a second allocation of non-transitory memory 652 provided to store and maintain a green-light list. Similarly, in various implementations, the configuration database 650 includes a third allocation of non-transitory memory 653 provided to store and maintain a yellow-light list. Similarly, in various implementations, the configuration database 650 includes a third allocation of non-transitory memory 654 provided to store and maintain a red-light list. In various implementations, a red-light list includes a list of configuration variables that cannot be added to or removed from a configuration file, or changed within a configuration file. Adding, removing or changing such configuration variables poses a high and/or intolerable risk of causing service disruptions and/or connectivity failures at an out-of-date compliant device that ultimately receives the configuration file. In some implementations, an example of a red-light configuration variable includes a list of per port native VLAN, which manages the native VLAN on each port listed. Another example includes a wired WAN enable configuration variable that indicates whether or not a secondary port on a security appliance is being used as an uplink or a downlink.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a hosted network management system:

receiving, at the hosted network management system, a fetch request from a compliant device through a metadata tunnel, the fetch request indicating demand for updated configuration data and instructions;

in response to receiving the fetch request, obtaining a cached configuration file from a respective compliant device cache, the cached configuration file associated with the compliant device;

determining the cached configuration file is an expired configuration file;

generating a new configuration file including the updated configuration data and instructions for the compliant device;

determining whether the new configuration file matches the expired configuration file within a match threshold based on a comparison of a first plurality of lines of the new configuration file and a second plurality of lines of the expired configuration file, the match threshold defining an amount of difference between the first plurality of lines and the second plurality of lines, the amount of difference permitting the new configuration file to have lines added to or removed from the first plurality of lines with the new configuration file matching the expired configuration file;

when the new configuration file matches the cached configuration file within the match threshold, providing the new configuration file to the compliant device; and when the new configuration file does not match the cached configuration file within the match threshold, providing a warning and/or the expired configuration file to the compliant device.

2. The method of claim 1, wherein the cached configuration file is a copy of a last known configuration file generated and sent to the compliant device or a copy of the last known configuration file scheduled to have been received and adopted by the compliant device.

3. The method of claim 1, wherein the fetch request comprises at least a portion of a configuration pull process initiated by the compliant device or a response to another configuration pull process initiated by the hosted network management system.

4. The method of claim 1, wherein the updated configuration data and instructions comprises a combination of configuration data, instructions, software and firmware updates, and rules provided by the hosted network management system in order to update the compliant device.

5. The method of claim 1, further comprising:

evaluating an extent to which the cached configuration file associated with the compliant device satisfies a recency threshold in order to produce an evaluation result; and selectively serving the cached configuration file based on the evaluation result.

6. The method of claim 5, wherein the recency threshold serves as a proxy that characterizes whether the new or updated configuration data and/or instructions satisfy local rules of an associated private network.

7. The method of claim 1, determining whether the new configuration file matches the expired configuration file within the match threshold comprises:

generating a comparison set based on the comparison; and determining a match result as a function of whether the comparison set is an empty set or a safe set based on association with a green-light list.

8. The method of claim 7, wherein the green-light list includes a list of configuration variables that can be added to or removed from a configuration file, or changed within the configuration file with little or no risk of causing service disruptions or connectivity failures at an out-of-date compliant device that ultimately receives the configuration file with changes.

9. The method of claim 7, wherein determining the match result as the function of whether the comparison set is the empty set or the safe set based on the green-light list includes permitting changes in lines that are in the new configuration file and the comparison set when those lines are associated with the green-light list.

10. The method of claim 9, when the comparison set is determined to include lines not associated with the green-light list, another match result is determined, the another match based on whether the one or more remaining lines in the comparison set represent a tolerable mismatch of a corresponding one or more configuration variables associated with a yellow-light list.

11. The method of claim 10, wherein the yellow-light list includes a list of configuration variables that cannot optionally be added to or removed from a configuration file, or arbitrarily changed within the configuration file with little or no risk of causing service disruptions or connectivity failures at an out-of-date compliant device that receives the configuration file.

12. The method of claim 10, wherein a configuration variable on the yellow-light list is bound by respective threshold range that limits how much a configuration variable value can change with little or no risk of causing service disruptions or connectivity failures at an out-of-date compliant device that receives the configuration file with changes.

13. A system comprising:

a network interface configured to receive a fetch request from a compliant device through a metadata tunnel, the fetch request indicating demand for updated configuration data and instructions; and a compliant device configuration coordination module configured to:

in response to receiving the fetch request, obtain a cached configuration file from a respective compliant device cache included in a hosted network management system, the cached configuration file associated with the compliant device;

determine the cached configuration file is an expired configuration file;

generate a new configuration file including the updated configuration data and instructions for the compliant device;

determine whether the new configuration file matches the expired configuration file within a match threshold based on a comparison of a first plurality of lines of the new configuration file and a second plurality of lines of the expired configuration file, the match threshold defining an amount of difference between the first plurality of lines and the second plurality of lines, the amount of difference permitting the new configuration file to have lines added to or removed from the first plurality of lines with the new configuration file matching the expired configuration file;

when the new configuration file matches the cached configuration file within the match threshold, provide the new configuration file to the compliant device; and when the new configuration file does not match the cached configuration file within the match threshold, provide a warning and/or the expired configuration file to the compliant device.

14. The system of claim 13, wherein the compliant device configuration coordination module includes a configuration assessment module configured to assess whether the new configuration file matches the expired cached configuration in accordance within the match threshold.

15. The system of claim 14, wherein the configuration assessment module is configured to:

generate a comparison set based on the comparison; and determine a match result as a function of whether or not the comparison set is an empty set or safe set based on association with a green-light list.

16. The system of claim 15, the green-light list includes a list of configuration variables that can be added to or removed from a configuration file, or changed within the configuration file with little or no risk of causing service disruptions or connectivity failures at an out-of-date compliant device that receives the configuration file with changes.

17. The system of claim 14, wherein the configuration assessment module is configured to determine a match result as a function of whether or not the one or more remaining lines in comparison set represent tolerable mismatch of a corresponding one or more configuration variables associated with a yellow-light list.

18. The system of claim 17, wherein a configuration variable on the yellow-light list is bound by respective threshold range that limits how much a configuration variable value can change with little or no risk of causing service disruptions or connectivity failures at an out-of-date compliant device that receives the configuration file with changes.

19. A device comprising:

a network interface configured to receive a fetch request from a compliant device through a metadata tunnel, the fetch request indicating demand for updated configuration data and instructions;

a processor; and a non-transitory memory including computer readable instructions that when executed by the processor, cause the device to:

in response to receiving the fetch request, obtain a cached configuration file from a respective compliant device cache included in a hosted network management system, the cached configuration file associated with the compliant device;

determine the cached configuration file is an expired configuration file;

generate a new configuration file including the updated configuration data and instructions for the compliant device;

determine whether the cached configuration file matches the new configuration file within a match threshold based on a comparison of a first plurality of lines of the new configuration file and a second plurality of lines of the expired configuration file, the match threshold defining an amount of difference between the first plurality of lines and the second plurality of lines, the amount of difference permitting the new configuration file to have lines added to or removed from the first plurality of lines with the new configuration file matching the expired configuration file;

when the new configuration file matches the cached configuration file within the match threshold, provide the new configuration file to the compliant device; and when the new configuration file does not match the cached configuration file within the match threshold, provide a warning and/or the expired configuration file to the compliant device.

20. The device of claim 19, wherein the warning and the expired configuration file is provided to the compliant device when the new configuration file does not match the cached configuration file within the match threshold and a time out expires after providing the warning to the compliant device.

* * * * *